US008534041B2

(12) United States Patent
Mee et al.

(10) Patent No.: US 8,534,041 B2

(45) Date of Patent: Sep. 17, 2013

(54) APPARATUS AND ASSEMBLY FOR A SPARK IGNITER HAVING TANGENTIAL EMBEDDED PINS

(75) Inventors: Brendon Francis Mee, Jacksonville, FL (US); Randal Parker Bold, Jacksonville, FL (US)

(73) Assignee: Unison Industries, LLC, Jacksonville, FL (US)

(*) Notice: Subject to any disclaimer, the term of this patent is extended or adjusted under 35 U.S.C. 154(b) by 763 days.

(21) Appl. No.: 12/646,516

(22) Filed: Dec. 23, 2009

(65) Prior Publication Data

US 2011/0146227 A1 Jun. 23, 2011

(51) Int. Cl.
*F02C 7/266* (2006.01)

(52) U.S. Cl.
USPC ..................... 60/39.827; 60/39.821; 313/143; 313/144; 313/118; 431/263; 431/264

(58) Field of Classification Search
USPC ................. 60/39.821-39.828; 313/118-145; 123/169 EL; 431/258-266; 102/202.5, 202.8
See application file for complete search history.

(56) References Cited

U.S. PATENT DOCUMENTS

| | | | | |
|---|---|---|---|---|
| 1,940,324 | A | 12/1933 | Hector | |
| 2,270,765 | A | 1/1942 | Nowosielski | |
| 2,344,597 | A | 3/1944 | Chaston et al. | |
| 2,391,455 | A | 12/1945 | Hensel | |
| 2,391,456 | A | 12/1945 | Hensel | |
| 2,391,458 | A | 12/1945 | Hensel | |
| 2,470,033 | A | 5/1949 | Hensel | |
| 2,586,864 | A | 2/1952 | Rose | |
| 2,591,718 | A | 4/1952 | Paul | |
| 2,712,685 | A | 7/1955 | Johnson et al. | |
| 3,691,419 | A | 9/1972 | Van Uum et al. | |
| 4,396,855 | A * | 8/1983 | Imai et al. | 313/139 |
| 4,771,209 | A | 9/1988 | Ryan | |
| 4,814,664 | A * | 3/1989 | Rothenbuhler | 313/131 R |
| 5,998,913 | A | 12/1999 | Matsutani | |
| 6,495,948 | B1 * | 12/2002 | Garrett, III | 313/141 |
| 6,920,762 | B2 * | 7/2005 | Wells et al. | 60/799 |

FOREIGN PATENT DOCUMENTS

FR 2459563 A1 1/1981

OTHER PUBLICATIONS

Champion Aerospace, Inc., Aviation Catalog AV-14, Apr. 2004, p. 43.*
EP Search Report issued in connection with corresponding EP Application No. 10196298.3, May 16, 2011.

* cited by examiner

*Primary Examiner* — William H Rodriguez
*Assistant Examiner* — Carlos A Rivera
(74) *Attorney, Agent, or Firm* — David J. Clement, Esq.; Armstrong Teasdale LLP

(57) ABSTRACT

An apparatus and assembly for an igniter is provided. The igniter includes a shell comprising a base, a tip surface, and a sidewall extending therebetween wherein the sidewall surrounds a cavity within the shell. The igniter also includes a shell bore extending from the tip surface to the cavity and a pin embedded into the tip surface extending substantially tangentially with respect to the bore.

18 Claims, 4 Drawing Sheets

APPARATUS AND ASSEMBLY FOR A SPARK IGNITER HAVING TANGENTIAL EMBEDDED PINS

BACKGROUND OF THE INVENTION

The field of the invention relates generally to spark igniters, and more specifically, to an apparatus and assembly for an extended life igniter assembly.

At least some known gas turbine engines include a spark igniter to facilitate engine starting and/or running. Such igniters are typically surface gap spark plugs in which a high energy spark discharge occurs between a center electrode and a ground electrode, traveling along the surface of an insulator. The spark discharge in such igniters is of the "high energy type" because of the nature of the ignition system used to cause sparking. The system includes a storage capacitor which is charged as the voltage applied thereto and across the igniter increases; when the applied voltage becomes sufficiently large to cause a spark discharge the electrical energy stored by the capacitor is discharged, flowing across the spark gap.

Electrode erosion has been a problem with spark igniters used with turbine engines for jet aircraft, sometimes constituting the limiting condition with respect to igniter life. Problem erosion of both the center electrode and the ground shell electrode occurs in igniters used with turbine engines. Conventional igniter ground electrodes are frequently made from Inconel® or from other conventional nickel alloys because they are relatively inexpensive. However, such electrodes may not provide the required service life in certain environments and duty cycles.

BRIEF DESCRIPTION OF THE INVENTION

In one embodiment, an igniter includes a shell comprising a base, a tip insulator surface, and a sidewall extending therebetween wherein the sidewall surrounds a cavity within the shell. The igniter also includes a shell bore extending from the tip surface to the cavity and a pin embedded into the tip surface extending substantially tangentially with respect to the bore.

In another embodiment, an igniter assembly includes a substantially cylindrical shell including a base, a tip surface, and a sidewall extending therebetween, the sidewall surrounding a cavity within the shell, the shell having a longitudinal axis extending parallel to the sidewall and orthogonally with respect to the tip surface. The igniter assembly also includes a shell bore extending from the tip surface to the cavity, the shell bore concentric with the longitudinal axis, at least one erosion-resistant pin coupled to the tip surface in a substantially tangential orientation with respect to the bore, and an electrode positioned within the shell, the electrode including a distal firing end positioned proximate the bore.

In yet another embodiment, a gas turbine engine includes a combustor including a sidewall enclosing a combustion chamber and an igniter assembly extending at least partially through the sidewall such that a tip of the igniter assembly is in flow communication with the combustion chamber, the igniter assembly including a tip surface including a shell bore and at least one erosion-resistant pin coupled to the tip surface in a substantially tangential orientation with respect to the bore.

BRIEF DESCRIPTION OF THE DRAWINGS

FIG. 1 is a schematic illustration of a gas turbine engine assembly in accordance with an exemplary embodiment of the present invention;

FIG. 2 is a perspective view, partially cut away of an igniter assembly in accordance with an exemplary embodiment of the present invention;

FIG. 3 is a perspective end view of igniter assembly in accordance with another embodiment of the present invention;

FIG. 4 is an end view of igniter assembly in accordance with an embodiment of the present invention; and FIG. 5 is a side view of igniter assembly in accordance with an embodiment of the present invention.

DETAILED DESCRIPTION OF THE INVENTION

The following detailed description illustrates embodiments of the invention by way of example and not by way of limitation. It is contemplated that the invention has general application to providing reliable operation and extended igniter component life in industrial, commercial, and residential gas turbine applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
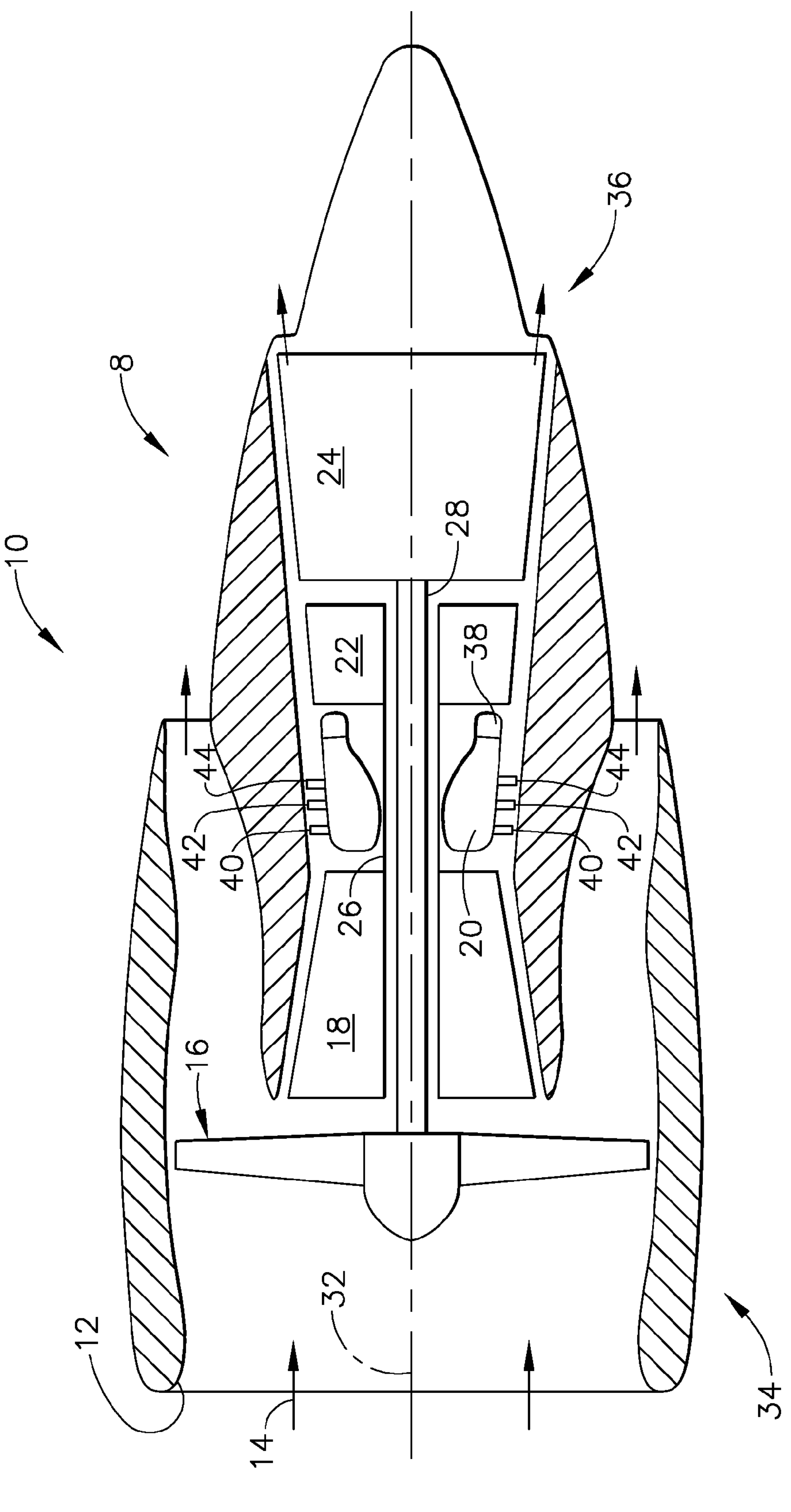
FIGS. 1-5 show exemplary embodiments of the apparatus and assembly described herein.

FIG. 1 is a schematic illustration of a gas turbine engine assembly 8 in accordance with an exemplary embodiment of the present invention. In the exemplary embodiment, gas turbine engine assembly 8 includes a high bypass, turbofan gas turbine engine 10 having in serial flow communication an inlet 12 for receiving ambient air 14, a fan 16, a compressor 18, a combustor 20, a high pressure turbine 22, and a low pressure turbine 24. High pressure turbine 22 is coupled to compressor 18 using a first shaft 26, and low pressure turbine 24 is coupled to fan 16 using a second shaft 28. Gas turbine engine 10 has an axis of symmetry 32 extending from an upstream side 34 of gas turbine engine 10 aft to a downstream side 36 of gas turbine engine 10. In the exemplary embodiment, gas turbine engine 10 also includes at least one igniter assembly 40 that is coupled proximate to combustor 20. Gas turbine engine 10 also includes at least one spark detector 42 and at least one pressure transducer 44 that are each coupled to gas turbine engine 10. In the exemplary embodiment, spark detector 42 is configured to detect a spark that is generated by igniter assembly 40, and pressure transducer 44 is configured to determine a pressure within combustor 20 approximately adjacent to spark igniter assembly 40.

During operation, airflow enters gas turbine engine 10 through inlet 12 and is compressed utilizing compressor 18. The compressed air is channeled downstream at an increased pressure and temperature to combustor 20. Fuel is introduced into combustor 20 wherein the air and fuel are mixed and ignited within combustor 20 to generate hot combustion gases. Specifically, pressurized air from compressor 18 is mixed with fuel in combustor 20 and ignited utilizing igniter assembly 40, thereby generating combustion gases. Such combustion gases are then utilized to drive high pressure turbine 22 which drives compressor 18 and to drive low pressure turbine 24 which drives fan 16.

Figure 2:
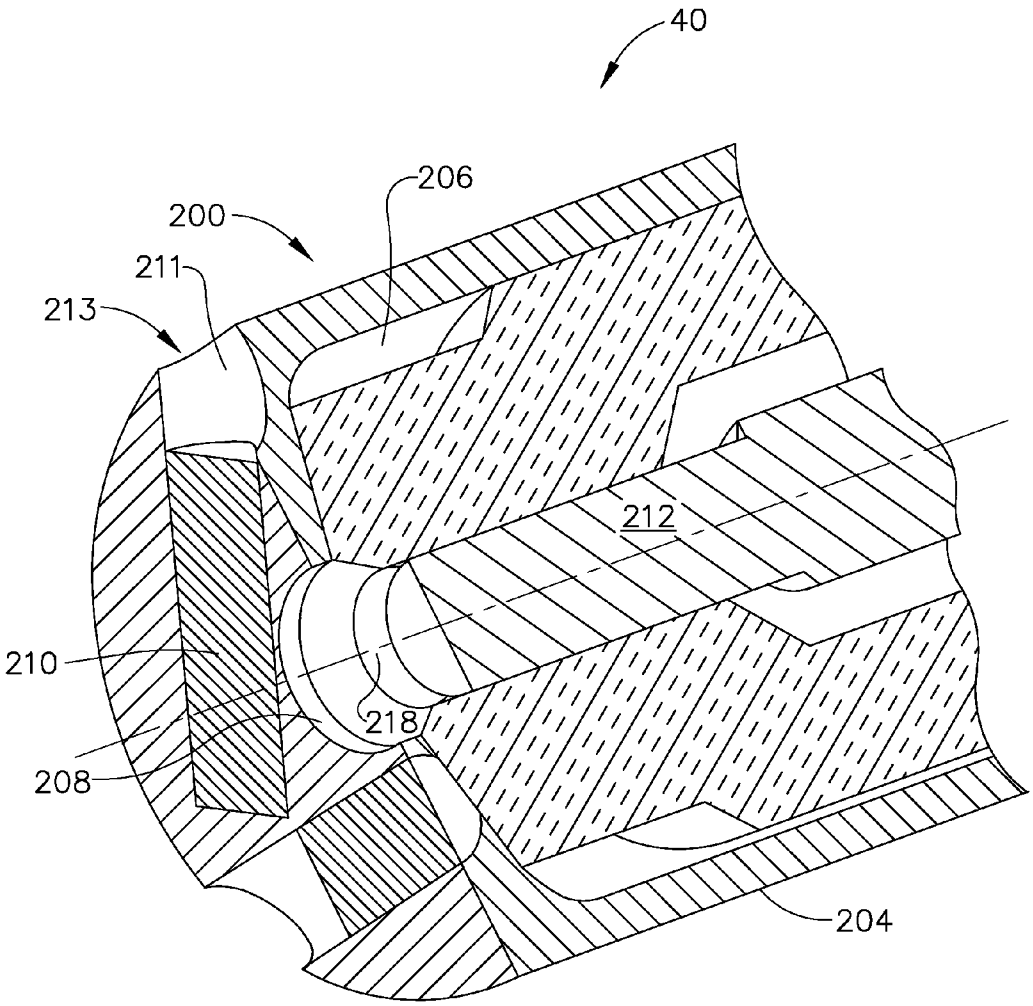

FIG. 2 is a perspective view, partially cut away of an igniter assembly 40 in accordance with an exemplary embodiment of the present invention. In the exemplary embodiment, igniter assembly 40 includes a shell 200 including a base (not shown in FIG. 2), a tip surface 202, and a sidewall 204 extending therebetween. Sidewall 204 surrounds a cavity 206 within shell 200. Shell 200 includes a shell bore 208 extending from tip surface 202 to cavity 206. In the exemplary embodiment, a pin 210 is embedded into tip surface 202 and extends substantially tangentially with respect to shell bore 208. In various embodiments, pin 210 includes an at least one of a circular cross-section, a partially circular cross-section, a polygonal cross-section, and an arcuate cross-section. Pin 210 may be coupled to tip surface 202 using a braze joint, a weld joint, a friction fit, an interference fit, or a combination thereof. Moreover, in another embodiment, pin 210 includes a width 209 and tip surface 202 includes a slot 211 having an opening 213 in tip surface 202. Slot 211 is configured to receive pin 210, wherein width 209 of slot opening 213 is less than width 209 of pin 210 providing an interference fit for pin 210. In various embodiments, tip surface 202 includes a plurality of pins, at least one of which is oriented tangentially with respect to shell bore 208. Also, in various embodiments, slot 211 may be at least partially open to shell bore 208. Pins 210 are intended to increase a life of igniter assembly 40 by being resistant to erosion of tip surface 202. In the exemplary embodiment, pins 210 comprise Iridium (Ir), Tungsten (W), Platinum (Pt), Rhodium (Rh), Ruthenium (Ru), Osmium (Os), or an alloy thereof.

Igniter assembly 40 further includes an electrode 212 positioned within shell 200. In the exemplary embodiment, electrode 212 includes a distal firing end 214 positioned proximate shell bore 208 and spaced apart from tip surface 202 by a spark gap 215.

An insulator 216 is positioned within shell 200 between shell 200 and electrode 212. Insulator 216 includes an insulator bore in substantial axial alignment with shell bore 208. In the exemplary embodiment, shell 200, insulator 216, and electrode 212 are substantially concentrically aligned with shell bore 208 and insulator bore 218. In various embodiments, shell 200, insulator 216, electrode 212, shell bore 208, and insulator bore 218 are aligned differently with respect to each other.

Figure 3:
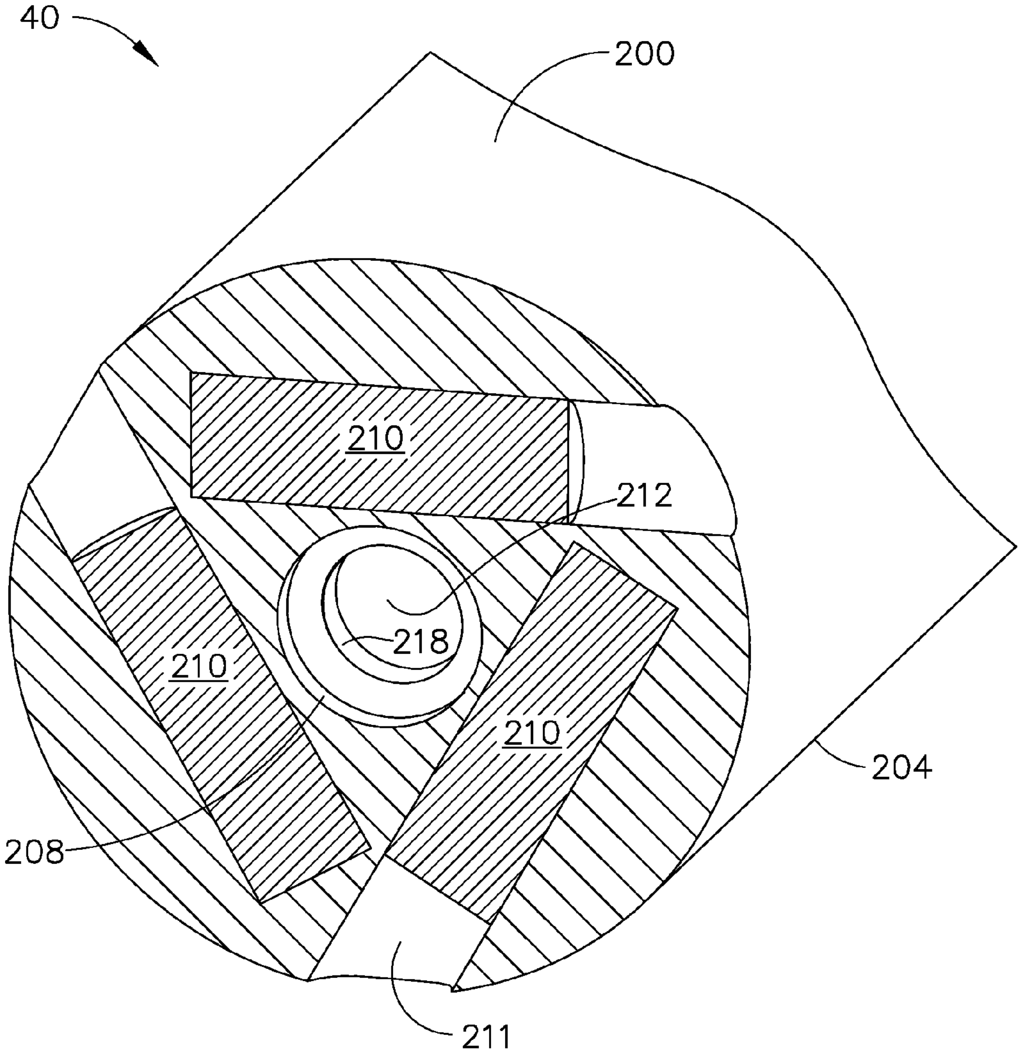

FIG. 3 is a perspective end view of igniter assembly 40 in accordance with another embodiment of the present invention. In this embodiment, three pins 210 are used in an orientation wherein all three pins 210 are aligned substantially tangentially with respect to shell bore 208.

Figure 4:
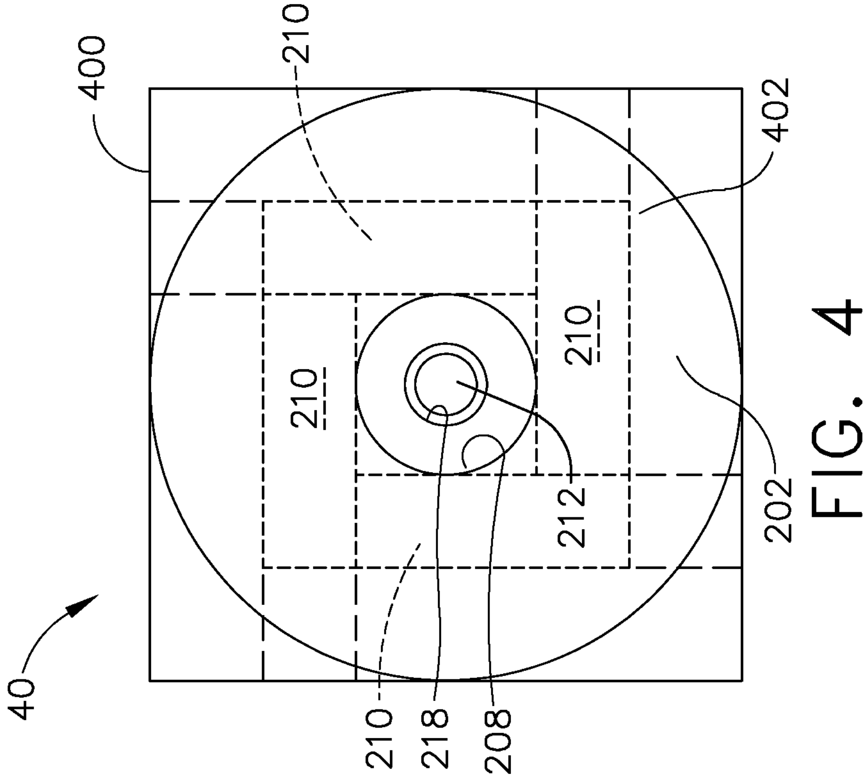

FIG. 4 is an end view of igniter assembly 40 in accordance with an embodiment of the present invention. In the exemplary embodiment, igniter assembly 40 includes a rectangular or square cross-section 400 that may be machined to a circular cross-section 402 during fabrication. Four pins 210 are embedded in tip surface 202 and circumscribe shell bore 208 tangentially.

Figure 5:
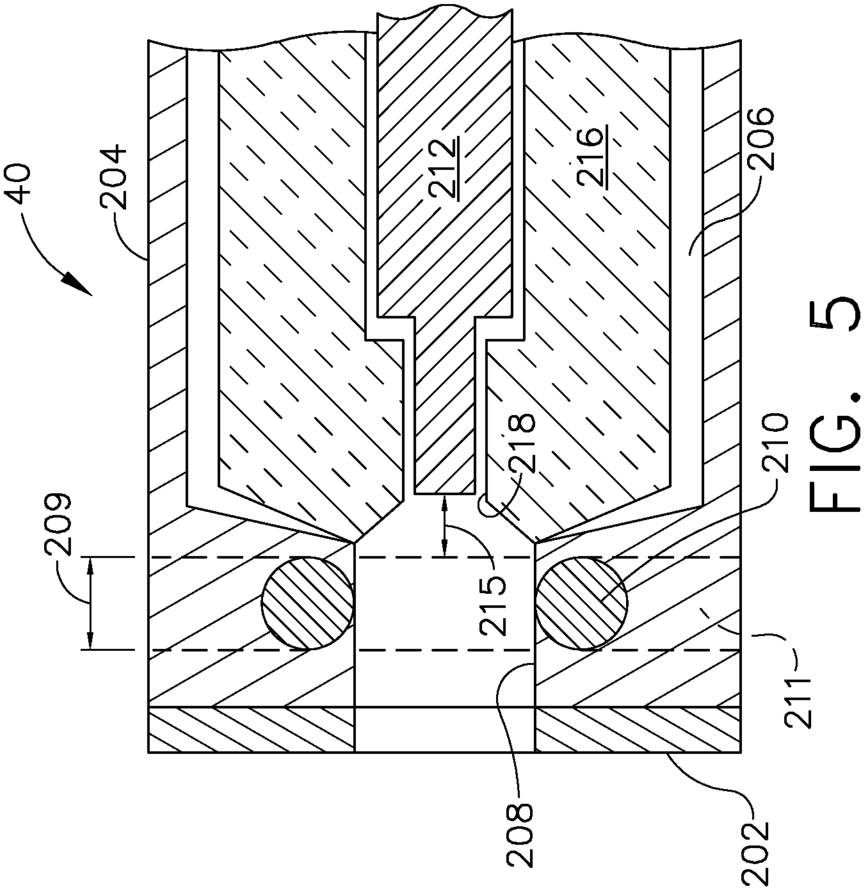

FIG. 5 is a side view of igniter assembly 40 in accordance with an embodiment of the present invention.

The above-described embodiments of an apparatus and assembly for a spark igniter provide a cost-effective and reliable means for extending a life of engine ignition components. More specifically, the apparatus and assembly described herein facilitate reducing wear of igniter components during use. As a result, the apparatus and assembly described herein facilitate increasing time between maintenance activities in a cost-effective and reliable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An igniter comprising:

a shell comprising a tip surface, and a sidewall extending away from said tip surface, said sidewall surrounding a cavity within the shell;

a shell bore extending from said tip surface to said cavity;

an electrode positioned within said shell, said electrode comprising a distal firing end positioned proximate said shell bore; and at least three pins having a first end embedded within said shell at a location between said tip surface and said distal firing end and extending parallel to a line that is substantially tangentially aligned with respect to said bore, wherein said at least three pins extend from the first end along the line such that a second end terminates embedded within said shell.

2. An igniter in accordance with claim 1, further comprising an insulator positioned within said shell between said shell and said electrode, said insulator comprising an insulator bore in substantial alignment with said shell bore.

3. An igniter in accordance with claim 2, wherein said shell, said insulator, and said electrode are substantially concentrically aligned with said shell bore and said insulator bore.

4. An igniter in accordance with claim 2, wherein said distal firing end is spaced apart from said tip surface by a spark gap.

5. An igniter in accordance with claim 1, wherein said pin comprises at least one of a rectangular cross-section and an at least partially circular cross-section.

6. An igniter in accordance with claim 1, wherein said at least three pins are coupled to said tip surface using at least one of a braze and a weld.

7. An igniter in accordance with claim 1, wherein said at least three pins comprise a width and said tip surface comprises a slot having an opening in said tip surface, said slot being configured to receive said pin, wherein a width of the slot opening is less than the width of said pin.

8. An igniter in accordance with claim 1, wherein said at least three pins comprise a width and said tip surface comprises a slot having an opening in said tip surface, said slot being configured to receive said pin, wherein a width of the slot opening is approximately equal to the width of said pin.

9. An igniter in accordance with claim 1, wherein said pin comprises at least one of Iridium (Ir), Tungsten (W), Platinum (Pt), Rhodium (Rh), Ruthenium (Ru), Osmium (Os), and an alloy thereof.

10. An igniter assembly comprising:

a substantially cylindrical shell comprising a tip surface, and a sidewall extending away from said tip surface, said sidewall surrounding a cavity within the shell, said shell having a longitudinal axis extending parallel to said sidewall and orthogonally with respect to said tip surface;

a shell bore extending from said tip surface to said cavity, said shell bore concentric with the longitudinal axis;

an electrode positioned within said shell, said electrode comprising a distal firing end positioned proximate said shell bore; and at least three erosion-resistant pins having a first end embedded within said substantially cylindrical shell at a location between said tip surface and said distal firing end and extending parallel to a line in a substantially tangential orientation with respect to said bore, wherein said at least three erosion-resistant pins extend from the first end along the line such that a second end terminates embedded within said shell.

11. An igniter assembly in accordance with claim 10, further comprising an insulator positioned within said shell between said shell and said electrode, said insulator comprising an insulator bore in substantial alignment with said shell bore.

12. An igniter assembly in accordance with claim 10, wherein said distal firing end is spaced apart from said tip surface by a spark gap.

13. An igniter assembly in accordance with claim 10, wherein said at least three erosion-resistant pins comprise at least one of Iridium (Ir), Tungsten (W), Platinum (Pt), Rhodium (Rh), Ruthenium (Ru), Osmium (Os), and an alloy thereof.

14. A gas turbine engine comprising:

a combustor comprising a sidewall enclosing a combustion chamber; and an igniter assembly extending at least partially through said sidewall such that a tip of said igniter assembly is in flow communication with said combustion chamber, said igniter assembly comprising:

a shell surrounding a cavity;

a shell bore extending from said tip to said cavity; and at least three erosion-resistant pins having a first end embedded within said shell at a location between said cavity and said tip and extending parallel to a line in a substantially tangential orientation with respect to said bore, wherein said at least three erosion-resistant pins extend from the first end along the line such that a second end terminates embedded within said shell.

15. A gas turbine engine in accordance with claim 14, further comprising an electrode positioned within said igniter assembly, said electrode comprising a distal firing end positioned proximate said shell bore.

16. A gas turbine engine in accordance with claim 15, further comprising an insulator positioned within said igniter assembly surrounding said electrode, said insulator comprising an insulator bore in substantial alignment with said shell bore.

17. A gas turbine engine in accordance with claim 15, wherein said distal firing end is spaced apart from said tip surface by a spark gap.

18. A gas turbine engine in accordance with claim 14, wherein said at least three erosion-resistant pins comprise at least one of Iridium (Ir), Tungsten (W), Platinum (Pt), Rhodium (Rh), Ruthenium (Ru), Osmium (Os), and an alloy thereof.

* * * * *